United States Patent
Geck et al.

(12)

(10) Patent No.: US 6,344,793 B1
(45) Date of Patent: Feb. 5, 2002

(54) PROCESS FOR ASSISTING A USER OF A MOTOR VEHICLE WHEN OPERATING COMPONENTS OF THE MOTOR VEHICLE AS WELL AS A PERTAINING SYSTEM

(75) Inventors: Berthold Geck, Weil der Stadt; Matthias Schneider, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/512,059

(22) Filed: Feb. 24, 2000

(30) Foreign Application Priority Data

Feb. 24, 1999 (DE) .......................................... 199 07 795

(51) Int. Cl.⁷ ................................................ B60Q 1/00
(52) U.S. Cl. ..................... 340/425.5; 340/996; 340/995; 340/989; 340/988; 340/961; 340/971; 364/424.05; 364/424.01; 364/521
(58) Field of Search ............................. 340/425.5, 996, 340/995, 989, 988, 961, 971; 364/424.05, 424.01, 521

(56) References Cited

U.S. PATENT DOCUMENTS

| | | | | |
|---|---|---|---|---|
| 4,787,040 A | * | 11/1988 | Ames et al. ........... | 364/424.01 |
| 5,091,856 A | * | 2/1992 | Hasegawa et al. ..... | 364/424.05 |
| 5,223,844 A | * | 6/1993 | Mansell et al. ........ | 342/357 |
| 5,535,422 A | * | 7/1996 | Chiang et al. ........ | 395/155 |
| 5,555,502 A | * | 9/1996 | Opel ................... | 364/424.05 |
| 5,714,948 A | * | 2/1998 | Farmakis et al. ..... | 340/961 |
| 5,751,228 A | * | 5/1998 | Kamiya et al. ....... | 340/988 |
| 5,844,500 A |   | 12/1998 | Beuk et al. .......... | 340/825.56 |
| 5,898,392 A | * | 4/1999 | Bambini et al. ...... | 340/996 |
| 5,982,368 A | * | 11/1999 | Toffolo et al. ....... | 345/348 |

FOREIGN PATENT DOCUMENTS

| | | | |
|---|---|---|---|
| DE | 33 29 768 | 3/1985 | ............ H04M/3/62 |
| DE | 44 10 985 A1 | 10/1995 | |
| EP | 0 898 377 | 2/1999 | ............ H04B/1/08 |
| JP | 10264739 | 10/1998 | ........... B60R/16/02 |
| WO | WO 98/34812 | 8/1998 | |

OTHER PUBLICATIONS

Copy of Japanese Office action with English translation dated Oct. 2, 2001.

* cited by examiner

Primary Examiner—Daniel J. Wu
Assistant Examiner—Tai T. Nguyen
(74) Attorney, Agent, or Firm—Crowell & Moring LLP

(57) ABSTRACT

In a process for assisting a user of a motor vehicle in operating components of the motor vehicle, operating conditions of the components are switched by actuating of operating elements. An assistance request element is also provided. Operation of the assistance request element causes a subsequent operation of an operating element only to display information concerning the operating condition which can be switched (in the normal operation) by means of this operating element.

17 Claims, 1 Drawing Sheet

PROCESS FOR ASSISTING A USER OF A MOTOR VEHICLE WHEN OPERATING COMPONENTS OF THE MOTOR VEHICLE AS WELL AS A PERTAINING SYSTEM

BACKGROUND AND SUMMARY OF THE INVENTION

This application claims the priority of German patent document 199 07 795.9, filed Feb. 24, 1999, the disclosure of which is expressly incorporated by reference herein.

The present invention relates to a process and apparatus for assisting the driver of a motor vehicle in operating components of the motor vehicle.

In recent years, the amount of the equipment in vehicles has increased substantially. As a result, the collective operation of the individual components takes place by a continuously increasing number of operating elements, for which printed operating instructions have conventionally been provided. Furthermore, an effort has also been made to design the operating elements in such a manner that the respective operating conditions or functions which are to be switched by each is easily recognizable. This applies, for example, to the electric seat adjustment, in which it is known to provide a switch configured in the form of a small seat, including switch elements shaped like a seat surface, a backrest and a headrest. By operation of one of the elements, the associated seat part is adjusted correspondingly. A similar situation exists for sliding roofs.

For other operating elements, it is, for example, known to the applicant to provide a display with different operating elements arranged at its edges. The operation which is to be switched by means of these operating elements can be changed, with the actually switchable operation shown on the display.

In German Patent Document DE 44 10 985 A1, an operating mode is provided for one or more operating elements, in which information can be emitted concerning the respective operating elements, either by display on a video screen or as acoustic information. In this operating mode, triggering of the particular function which is switched by means of the operating element can be suppressed. On the other hand, it is also possible to trigger this function in addition to the displayed or acoustically emitted information; advantageously this occurs when it is recognized that a hand approaches the operating element. Information can be displayed or indicated in this manner which relates directly to the operating element, and/or which relates to conditions which can be switched subsequently.

It is an object of the present invention to improve the assistance provided to the user in devices such as described above.

This and other objects and advantages are achieved by the method and apparatus according to the invention, which includes an "assistance request element". After actuation of the assistance request element, information is then emitted concerning the operating condition or function which can be switched (in normal operation) by means of the operating element which is operated immediately thereafter.

This arrangement is especially advantageous when the user wants to request information concerning a particular operating element. That is, after operation of the assistance request element, information is emitted concerning only the next actuated operating element; thereafter subsequent operations of the operating elements can switch the corresponding functions once again. Thus, the operation is advantageously simplified. The user can request the information and, immediately after he has found the correct operating element for the desired function to be switched based on the displayed or emitted information, he can switch the function by another operation of this operating element.

In addition, it is advantageous to design the system such that misunderstandings cannot occur during its operation. That is, when, by means of a switch, a system is switched into the mode in which only a display or emission of an information of the switchable functions takes place (function query mode), misunderstandings might occur when a user, after actuating an operating element, expects the corresponding function to be switched, because he is familiar with the system and does not pay attention to a display of information. The user may then think that a malfunction is occurring.

According to the invention, however, actuation of an operating element after the operation of the assistance request element does not switch the respective operating condition (as occurs in normal operation); rather only an information is emitted concerning this operating condition which can be switched in the normal operation. As a result, the user is advantageously enabled to become familiar with the individual functions gradually, without switching the respective operating condition. In particular, this can avoid the switching of actually undesired operating conditions which could otherwise result from a searching trial of the operating elements. In addition to a gradual learning, it is also possible during the setting of operating conditions of one component, to request, in an up-to-date manner, the switchable operating conditions of individual operating elements.

The operating elements may be manually actuatable, or they may also consist of voice decoders. In the latter case, at least individual components are operated in a voice-controlled manner. By speaking corresponding keywords, the individual operating conditions of the components are selected.

The assistance request element itself may also be operable manually, such as a key or button, or it may also consist, for example, of a voice decoder, which may be activated when the word "HELP" or the word "ASSISTANCE" is recognized.

The components which are operable in this manner may be, for example, the air conditioner, seat adjustment, a navigation system, an audio and/or video set, a cruise control system, the vehicle lights or other vehicle components. Also, information concerning the system may be shown on a display.

Advantageously, a display can be provided which is, for example, in the driver's field of view. The switchable operating conditions can then easily be perceived by the driver of the vehicle.

In another embodiment of the invention, information is emitted by means of a voice emission. As a result, the driver's attention can better remain focused on the traffic. In addition, the information can be perceived in a simple manner by all vehicle occupants, who because of their differing viewing directions, may have only limited ability to view a display.

According to another feature of the invention, information can be emitted concerning only some of the operating elements of the vehicle, these operating elements being separately identified. It is possible for example, that for a subsequently installed radio set, no information can be displayed concerning the operating conditions which can be switched by means of the operating elements. Advantageously, the operating elements about which information can be emitted may therefore be correspondingly identified. This identification can, for example, be illuminated, so that it can also be seen at night.

Another embodiment of the invention has an assistance request element whose operation causes, with respect to subsequent operation of an operating element of at least one component, only information to be emitted concerning the operating condition which can be switched by means of this operating element in the normal operation.

According to still another feature of the invention, the assistance request element can be operated manually, and is provided with a key function as well as with a locking function.

The assistance request element is therefore constructed as a manually operable key/button whose operation causes the emission of information concerning the operating condition which can be switched in the normal operation by means of the operating element actuated next. Furthermore, the assistance request element is also designed so that it can be locked in an activating position. Thereafter, information is emitted concerning the operating conditions which can be switched in normal operation for all operating elements operated during the locked in activation. This is particularly advantageous if the user wants to obtain a comprehensive overview of the operation of individual or several components. It will then be possible to obtain cohesive information by successive occurring operation of the operating elements.

In the case of this embodiment, the user can decide whether he wants to have information emitted only concerning the operating element which is operated next, or whether more comprehensive information is to be emitted concerning all operating elements operated during the activation of the assistance request element.

For all above-described embodiments it is generally possible to adapt flexibly the extent of the information which is to be emitted. Thus, the extent of the information to be emitted may decrease as a function of the fact that the assistance request element is used with decreasing frequency by vehicle operator. Adaptation can also take place in that, as a function of the overall operating time of the vehicle, the extent of the information to be emitted is reduced, subject to increase again when the assistance request element is used more frequently.

The invention is particularly useful for a vehicle in which the systems are linked by means of a bus, in which the switch operations (assistance request element as well as operating element) can be requested in a simple centralized manner. Therefore, without large expenditures, the operation for the switching of an operating condition in the normal operation mode can be differentiated from the operation for displaying information, by determining whether the assistance request element was operated or is activated.

In the knowledge of the invention, reference is made to the generally known user guidance in which, for example, in the case of computer software, a so-called help function is present. By means of this help function, a user can display information on the video screen. For this purpose, after the selection of a help mode, by means of corresponding further input and further search terms concerning different topics, the different software-related information concerning functions of the software is displayed.

Other objects, advantages and novel features of the present invention will become apparent from the following detailed description of the invention when considered in conjunction with the accompanying drawings.

DETAILED DESCRIPTION OF THE DRAWINGS

Figure 1:
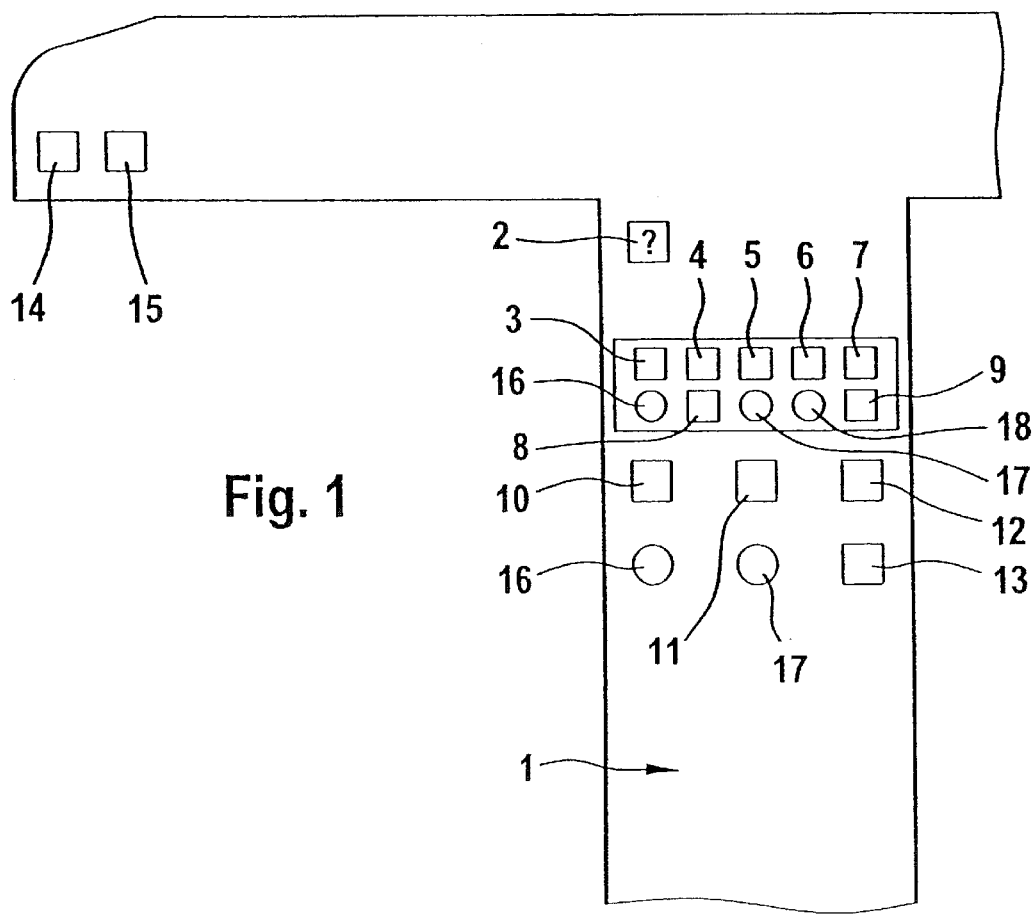
FIG. 1 is a schematic view of an embodiment of the system according to the invention.

FIG. 1 illustrates a center console 1 of a vehicle with an assistance request element 2 situated at a significant point on the center console 1. The assistance request element 2 may, for example, be identified by a clearly visible question mark mounted on it. This question mark can also be illuminated so that the assistance request element 2 will easily be visible at night.

The assistance request element 2 can be constructed as a key/button, which is operable to cause a display of information concerning the function which is switched (in the normal operation mode) by whichever one of the operating element 3, 4, 5, 6, 7, 8, 9, 10, 11, 12, 13, 14, 15 is operated next, without any switching of this operating condition. In addition or as an alternative, the assistance request element 2 may have a locking function; that is, it may be constructed, for example, as a switch. In this case, for each actuated operating elements 3, 4, 5, 6, 7, 8, 9, 10, 11, 12, 13, 14, 15, information is emitted concerning the operating conditions which it switches in normal operation, without actually switching any of the operating conditions.

It is illustrated that several operating elements 3, 4, 5, 6, 7, 8, 9 may all concern a single vehicle component, in which case several operating conditions of these components may be switchable by way of the individual operating elements. Such a component may, for example, be the air conditioner of a vehicle. Optionally, such a component may also have operating elements 16, 17, 18 for which no information can be emitted. These may, for example, be operating elements whose method of operation is self-explanatory, such as the on/off function. Advantageously, the operating elements 16, 17, 18 with respect to which no information can be displayed can be differentiated from the operating elements for which information can be indicated. In the representation of FIG. 1, this is indicated by providing these operating elements with a shape (round) different from that of the operating elements (cornered) for which information can be indicated. Alternatively, such differentiation can be implemented by labeling.

In addition to operation elements of a component, other operating elements 10, 11, 12, 13, 14, 15 with respect to which information can be emitted are also visible. These operating elements may, for example, be light switches and similar devices.

Further, operating elements 16, 17, with respect to which no information can be emitted, are also visible.

Figure 2:
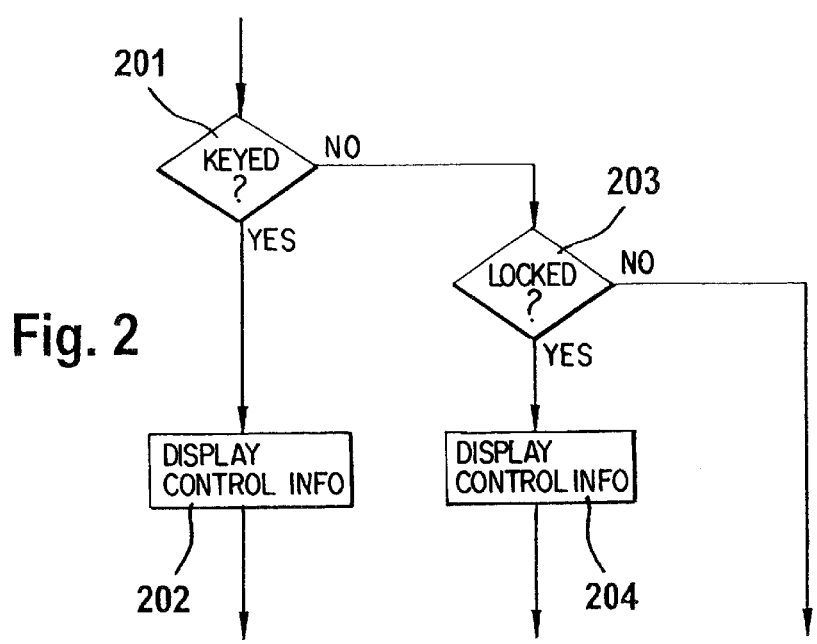
FIG. 2 is a view of a process sequence according to the invention.

FIG. 2 illustrates a sequence of the process according to the invention. In step 201, it is determined whether the assistance request element 2 has been operated. If so, in step 202 during the next operation of an operating element for which information can be emitted, only the information is emitted, without any switching of the pertaining operating condition.

If in step 201 it is determined that the assistance request element 2 was not keyed, it is queried in step 203 whether the assistance request element 2 is locked in its activated position. If not, implementation of the process is concluded, and normal operation resumes.

If the assistance request element 2 is locked in its activated position, in step 204 with respect to an operated operating elements for which information can be emitted, only the information is emitted, without switching of the operating conditions, so long as the assistance request element 2 is locked in its activated position. This can take place, for example, by the setting of a flag.

Instead of being operated by means of a key/button, the assistance request element 2 may of course also be constructed so that it can be operated by means of voice recognition.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for assisting a user of a motor vehicle in the operation of a plurality of components of the motor vehicle, which components have operating conditions or functions that can be influenced by actuation of a corresponding plurality of respective operating elements associated therewith, said process comprising:

providing an assistance request element in said vehicle, which assistance request element is operable to cause communication concerning the nature of a function or condition which can be influenced by actuating any selected one of said operating elements;

after an actuation of the assistance request element, emitting information concerning the nature of an operating condition or function which, in a normal operation mode, can be influenced by a particular operating element that is selected by actuating such particular operating element next following actuation of the assistance request element, without said next actuation influencing said operating condition or function associated with said particular operating element.

2. Process according to claim 1, wherein the information is emitted on a display.

3. Process according to claim 1, wherein the information is emitted by means of a voice output.

4. Process according to claim 1, wherein information can be emitted only with respect to a limited number of the operating elements of the vehicle, operating elements which are included in said limited number of operating elements being separately identified by a characteristic feature.

5. System for assisting a user of a motor vehicle in operating components of the motor vehicle, which components have operating conditions or functions that can be influenced by actuation of operating elements of the components, comprising:

an assistance request element which is actuatable to cause the vehicle to enter a query mode, in which a subsequent actuation of a particular operating element causes information to be emitted concerning an operating condition which can be switched, in a normal operation mode, by actuation of the particular operating element, without said actuation of said particular operating element influencing an operating condition or function associated with said particular operating element.

6. System according to claim 5, wherein the assistance request element is manually operable and has both a keying and a locking function.

7. A method of assisting a vehicle operator in controlling a plurality of vehicle functions which can be influenced by actuation of a corresponding plurality of operating elements in a normal mode of operation, comprising:

said vehicle operator enabling a function query mode, by actuating an assistance request element;

during said function query mode, said vehicle operator thereafter actuating at least one operating element;

in response to actuation of said at least one operating element during said function query mode, displaying information concerning a vehicle function which can be influenced by each of the at least one actuated operating element; and terminating said function query mode, whereby subsequent actuation of an operating element influences a corresponding vehicle function.

8. The method according to claim 7, wherein said function query mode terminates automatically upon actuation of a single operating element following actuation of the assistance request element.

9. The method according to claim 7, wherein:

said actuation of said assistance request element locks in said function query mode until said assistance request element is actuated once again; and for each operating element actuated during said function query mode, a corresponding vehicle function is displayed.

10. Process according to claim 7, wherein information can be emitted only with respect to a limited number of the operating elements of the vehicle, operating elements which are included in said limited number of operating elements being separately identified by a characteristic feature.

11. A method according to claim 10, wherein said characteristic feature is shape.

12. A method for displaying information concerning functionality of a plurality of manually actuatable switch elements for influencing operation of associated systems in a vehicle that has an interface for communicating information to a vehicle user said method comprising:

said vehicle user performing an act constituting a request for assistance information;

following said request, said vehicle user manually actuating a selected switch element;

manual actuation of said selected switch element causing said interface to communicate information concerning functionality of said selected switch element, without said manual actuation influencing operation of a vehicle system associated with said selected switch element.

13. The method according to claim 12, wherein said request for assistance has two alternative modes:

in a first mode, only a next successive actuation of a selected switch element causes a communication of functionality information without influencing operation of associated vehicle systems;

in a second mode, said request is continuing, and each successive actuation of respective selected switch elements while said request continues causes communication of functionality information without influencing operation of associated vehicle systems.

14. Apparatus for displaying information concerning functionality of a plurality of manually actuatable switch elements for influencing operation of associated motor vehicle systems, comprising:

an assistance request element; and interface means for communicating to a vehicle user information concerning functionality of respective switch elements;

wherein actuation of a switch element following actuation of the assistance request element causes said interface means to communicate information concerning functionality of said actuated switch element, without said actuation influencing operation of a vehicle system associated with said actuated switch element.

15. An apparatus according to claim 14, wherein actuation of said assistance request element has two alternative modes:

in a first mode, only a next successive actuation of a switch element causes a communication of functionality information without influencing operation of the associated vehicle system;

in a second mode, actuation of said assistance request element is locked, and each successive actuation of respective switch elements while said assistance request element is locked, causes communication of functionality information without influencing operation of associated vehicle systems.

16. A vehicle system control apparatus comprising:

a plurality of manually actuatable switch elements for influencing operation of associated vehicle systems;

an assistance request element; and interface means for communicating to a vehicle user information concerning functionality of respective switch elements;

wherein actuation of a switch element following actuation of the assistance request element causes said interface means to communicate information concerning functionality of said actuated switch element, without influencing operation of a vehicle system associated with said actuated switch element.

17. An apparatus according to claim 16, wherein actuation of said assistance request element has two alternative modes:

in a first mode, only a next successive actuation of a switch element causes a communication of functionality information without influencing operation of the associated vehicle system;

in a second mode, actuation of said assistance request element is locked, and each successive actuation of respective switch elements while said assistance request element is locked, causes communication of functionality information without influencing operation of associated vehicle systems.

* * * * *